United States Patent
Holdeman et al.

(10) Patent No.: US 12,404,155 B2
(45) Date of Patent: Sep. 2, 2025

(54) WINCH OR HOIST HAVING A GEARBOX WITH HIGH-CONTACT RATIO GEARS

(71) Applicant: BPG-ARROWHEAD WINCH INC., Broken Arrow, OK (US)

(72) Inventors: Brian Holdeman, Broken Arrow, OK (US); Daryl Toole, Broken Arrow, OK (US)

(73) Assignee: BPG-ARROWHEAD WINCH INC., Broken Arrow, OK (US)

( * ) Notice: Subject to any disclaimer, the term of this patent is extended or adjusted under 35 U.S.C. 154(b) by 512 days.

(21) Appl. No.: 17/612,190

(22) PCT Filed: May 21, 2019

(86) PCT No.: PCT/US2019/033380
§ 371 (c)(1),
(2) Date: Nov. 17, 2021

(87) PCT Pub. No.: WO2020/236160
PCT Pub. Date: Nov. 26, 2020

(65) Prior Publication Data
US 2022/0212905 A1    Jul. 7, 2022

(51) Int. Cl.
*B66D 1/00* (2006.01)
*B66D 1/22* (2006.01)
(Continued)

(52) U.S. Cl.
CPC ............... *B66D 1/22* (2013.01); *F16H 1/46* (2013.01); *F16H 55/08* (2013.01)

(58) Field of Classification Search
CPC ... B66D 1/08; B66D 1/12; B66D 1/22; B66D 1/7484; B66D 3/22; F16H 1/46; F16H 55/08
See application file for complete search history.

(56) References Cited

U.S. PATENT DOCUMENTS 2,931,248 A * 4/1960 Walton .................. F16H 49/001
                                                    74/640
3,627,087 A * 12/1971 Eskridge ................... F16H 1/32
                                                    188/134

(Continued)

FOREIGN PATENT DOCUMENTS

EP     0211309 A1    2/1987
EP   0 504 565 A1    9/1992
(Continued)

OTHER PUBLICATIONS

AGMA 933-B03, "Basic Gear Geometry", American Gear Manufacturers Association, Mar. 13, 2003. (26 pages).
(Continued)

*Primary Examiner* — Emmanuel M Marcelo
(74) *Attorney, Agent, or Firm* — Seed Intellectual Property Law Group LLP

(57) ABSTRACT

A winch or a hoist (100) includes an input shaft, a rotatable drum (112), and a gearbox (120) including a plurality of high-contact ratio spur-type gears, the gearbox coupled to the input shaft and to the rotatable drum such that rotation of the input shaft at a first speed drives rotation of the rotatable drum at a second speed that is different than the first speed.

17 Claims, 15 Drawing Sheets

(51) Int. Cl.
*F16H 1/46* (2006.01)
*F16H 55/08* (2006.01)

(56) References Cited

U.S. PATENT DOCUMENTS

| | | | |
|---|---|---|---|
| 4,108,017 | A | 8/1978 | Rouverol |
| 4,453,430 | A * | 6/1984 | Sell .................... B66D 1/44 |
| | | | 475/116 |
| 4,663,128 | A * | 5/1987 | Helgeland ............ C30B 15/30 |
| | | | 254/293 |
| 4,736,929 | A | 4/1988 | McMorris |
| 2004/0041137 | A1* | 3/2004 | Shoji .................... B66D 1/14 |
| | | | 242/390.8 |
| 2005/0279978 | A1 | 12/2005 | Huang |
| 2015/0210517 | A1* | 7/2015 | Nishimoto ........... B66D 1/7436 |
| | | | 254/323 |
| 2017/0166422 | A1* | 6/2017 | Mahnken ............... B66D 1/39 |
| 2019/0002254 | A1* | 1/2019 | Dennis .................... F16H 57/10 |
| 2019/0016571 | A1* | 1/2019 | Thirunarayana ..... H02K 7/1016 |
| 2020/0140245 | A1* | 5/2020 | Yasuda ................ B64C 39/024 |
| 2021/0131529 | A1* | 5/2021 | Base ........................ F16H 3/76 |

FOREIGN PATENT DOCUMENTS

| | | |
|---|---|---|
| EP | 1 925 854 A2 | 5/2008 |
| KR | 20150017394 A | 2/2015 |
| WO | 2006/038901 A1 | 4/2006 |
| WO | WO-2020236160 A1 * 11/2020 ............... B66D 1/22 |

OTHER PUBLICATIONS

Anderson et al., "Efficiency of Nonstandard and High Contact Ratio Involute Spur Gears", NASA Technical Memorandum 83725, USAAVSCOM Technical Report 84-C-9, Forth International Power Transmission and Gearing Conference, Oct. 10-12, 1984. (35 pages).

ANSI/AGMA 2002-B88, "Tooth Thickness Specification and Measurement", American Gear Manufacturers Association, Dec. 2006. (48 pages).

Srinivas et al., "Comparison of High Contact Ratio and Low Contact Ratio Gears", International Journal of Scientific Research in Science and Technology, 3(8): 657-669, Dec. 9, 2017.

Lin et al. "Computer-Aided Design of High-Contact-Ratio Gears for Minimum Dynamic Load and Stress", Journal of Mechanical Design, 115: 171-178, Mar. 1993.

* cited by examiner

WINCH OR HOIST HAVING A GEARBOX WITH HIGH-CONTACT RATIO GEARS

BACKGROUND

Technical Field

The present disclosure relates generally to winches and hoists including gear boxes, and more particularly to winches and hoists including high-contact ratio gearing.

Description of the Related Art

Winches and hoists are typically driven by a motor, such as a hydraulic motor, and are often provided with gearboxes that change, e.g., increase or decrease, the speed at which the winch or hoist is driven relative to the speed of an output shaft of the motor. For example, a hydraulic motor can drive an output shaft thereof to rotate about its own central longitudinal axis at a first speed. The output shaft of the hydraulic motor can be rotationally coupled to an input shaft of a gearbox of a winch or hoist, and the gearbox can in turn drive a spool or a drum of the winch or hoist to rotate about its own central longitudinal axis at a second speed that is different than, e.g., greater than or less than, the first speed. Such gearboxes can also be used to increase or decrease the torque transferred to the spool or drum of the winch or hoist, which may in turn increase or decrease the total working capacity of the winch or hoist.

Traditional spur-type gearing creates more noise than desired in some particularly noise-sensitive applications, and is in some cases not suitable where noise, vibration, and harshness (NVH) are a major concern. A relatively standard solution in such cases is to use helical gearing, which generally creates less noise, vibration, and harshness, rather than spur-type gearing. Nevertheless, helical gearing has its own drawbacks, including the generation of thrust forces, that render it undesirable in certain applications.

Characteristic shapes of gear teeth are relatively standardized. Relevant information and standards have been published by the American Gear Manufacturers Association, such as in AGMA 933-B03, titled "Basic Gear Geometry," in ANSI/AGMA B88, titled "Tooth Thickness Specification and Measurement," in ISO 6336, and in other, related documents, such as counterpart Japanese and other national standards. Gears with teeth that do not conform to such standards have been used in certain applications. For example, gears with gear teeth shaped to provide a higher contact ratio than that specified in the AGMA and other relevant standards have been used in certain applications. Such gearing has significant disadvantages, however. For example, it requires significantly greater precision and is therefore more expensive to manufacture.

BRIEF SUMMARY

A winch or hoist may be summarized as comprising: an input shaft; a rotatable drum; and a gearbox including a plurality of high-contact ratio spur-type gears, the gearbox coupled to the input shaft and to the rotatable drum such that rotation of the input shaft at a first speed drives rotation of the rotatable drum at a second speed that is different than the first speed. The gearbox may be a planetary gearbox. The high-contact ratio spur-type gears may include internal gear teeth and external gear teeth.

The high-contact ratio spur-type gears may have a higher contact ratio than specified in ANSI/AGMA B88. The high-contact ratio spur-type gears may include gear teeth having longer addendums than specified in ANSI/AGMA B88. The high-contact ratio spur-type gears may include gear teeth having longer dedendums than specified in ANSI/AGMA B88. Each of the high-contact ratio spur-type gears may have a respective diametral pitch and include gear teeth having addendums greater than 1.00, 1.05, 1.10, 1.15, or 1.20 divided by the respective diametral pitch. Each of the high-contact ratio spur-type gears may have a respective diametral pitch and include gear teeth having dedendums greater than 1.25, 1.30, 1.35, or 1.40 divided by the respective diametral pitch. Each of the high-contact ratio spur-type gears may have a contact ratio greater than 1.60, 1.80, or 2.00.

A method of operating a winch or hoist or be summarized as comprising: coupling an input shaft of the winch or hoist to a motor; coupling a cable coupled to a rotatable drum of the winch or hoist to a load to be moved, wherein a gearbox including a plurality of high-contact ratio spur-type gears is coupled to the input shaft and to the rotatable drum such that rotation of the input shaft at a first speed drives rotation of the rotatable drum at a second speed that is different than the first speed; and actuating the motor to drive rotation of the input shaft at the first speed and rotation of the rotatable drum at the second speed, thereby moving the load.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with the technology have not been shown or described in detail to avoid unnecessarily obscuring descriptions of the embodiments.

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments. Also, as used in this specification and the appended claims, the singular forms "a," "an," and "the" include plural referents unless the context clearly dictates otherwise. It should also be noted that the term "or" is generally employed in its sense including "and/or" unless the context clearly dictates otherwise.

The use of ordinals such as first, second and third does not necessarily imply a ranked sense of order, but rather may only distinguish between multiple instances of an act or structure. Various examples of suitable dimensions of components and other numerical values are provided herein. Such dimensions are accurate to within standard manufacturing tolerances unless stated otherwise.

Figure 1:
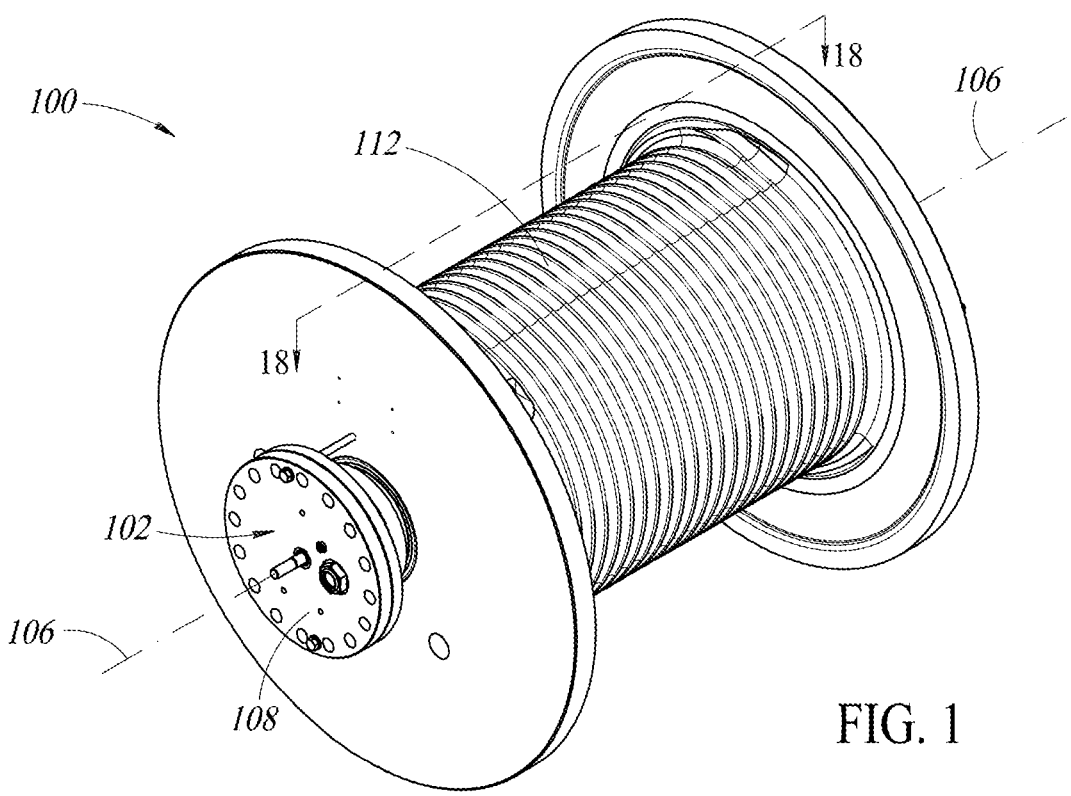
FIG. 1 illustrates a perspective view of a winch including a gearbox having high-contact ratio gearing.
Figure 2:
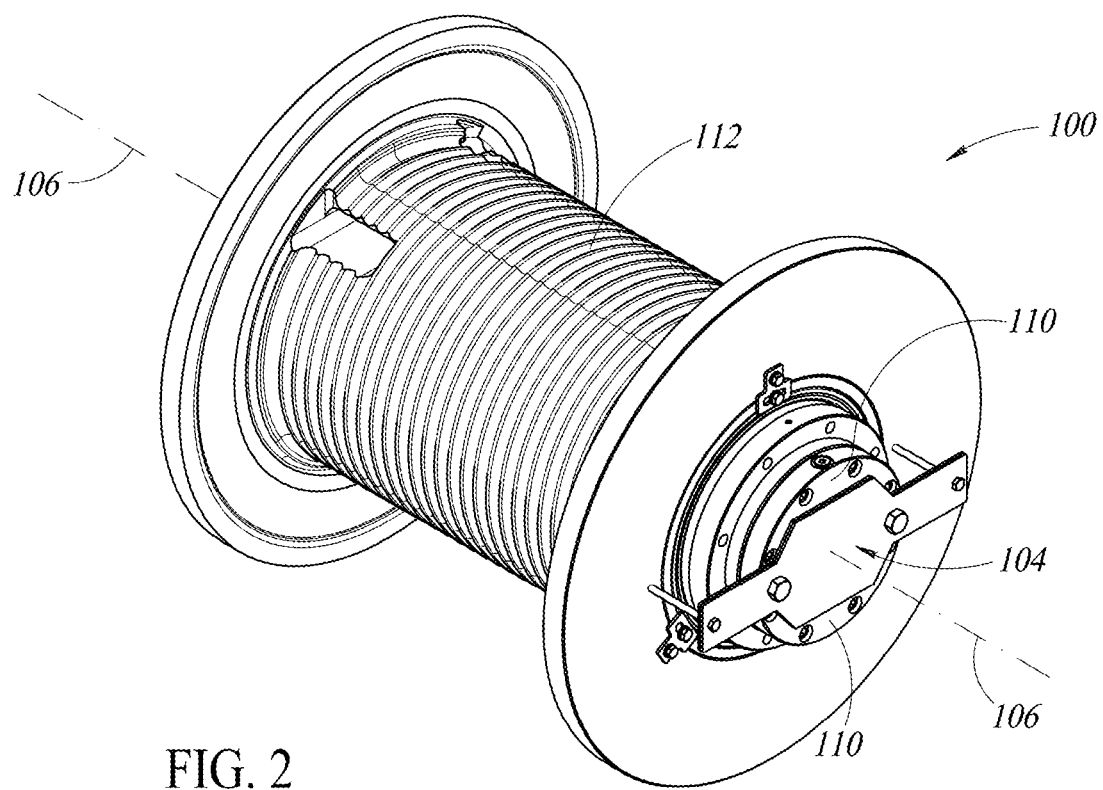
FIG. 2 illustrates another perspective view of the winch of FIG. 1.
Figure 18:
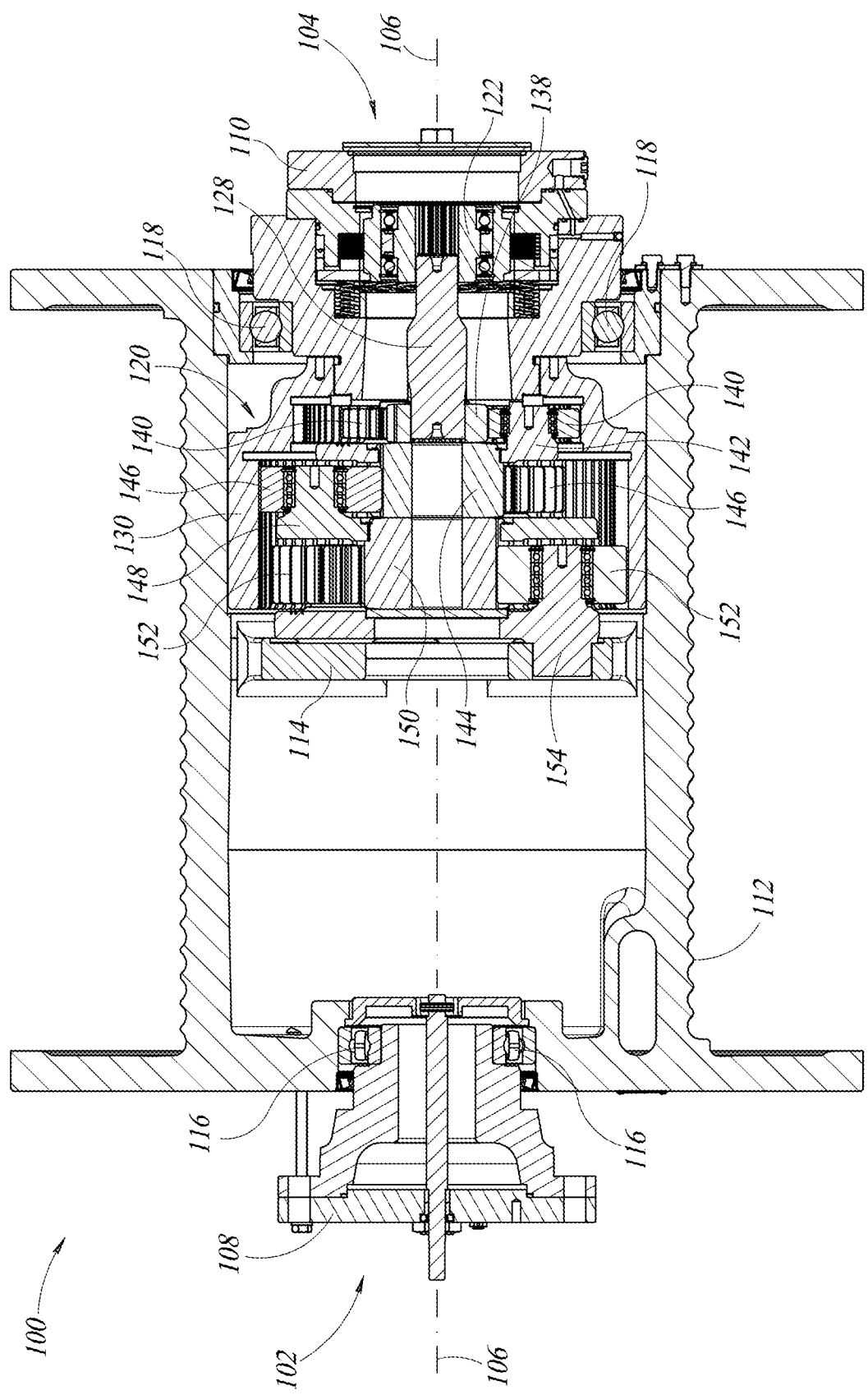
FIG. 18 illustrates a cross-sectional view of the winch of FIG. 1.

FIG. 1 illustrates a perspective view of a first end 102 of a winch 100 that has a central longitudinal axis 106. FIG. 2 illustrates a perspective view of a second end 104 of the winch 100, which is opposite to the first end 102 illustrated in FIG. 1 along the central longitudinal axis 106. FIG. 18 illustrates a cross-sectional view of the winch 100. The winch 100 itself, as well as various components of the winch 100, have cylindrical, generally cylindrical, rotationally symmetric, and/or generally rotationally symmetric shapes when viewed along the central longitudinal axis 106. That is, the winch 100, and each of a variety of components of the winch 100, have respective central longitudinal axes, with each of those respective central longitudinal axes being coincident with one another, as illustrated by axis 106 in FIGS. 1 and 2. Some components of the winch 100 are also configured to rotate about the central longitudinal axis 106, as described elsewhere herein.

FIG. 1 illustrates that the winch 100 includes a first mounting flange 108 at its first end 102, which is oriented perpendicular to the central longitudinal axis 106 and includes a plurality of holes or apertures extending therethrough along respective axes parallel to the central longitudinal axis 106. In use, the winch 100 can be mounted to another piece of machinery by mechanical fasteners such as bolts or screws that extend through the apertures in the first mounting flange 108 and through corresponding apertures in a mounting flange of the other piece of machinery. When the winch 100 is mounted to another piece of machinery in this way, the mounting first flange 108 is rigidly coupled to the other piece of machinery and remains stationary with respect to the other piece of machinery during use.

FIG. 2 illustrates that the winch 100 also includes a second mounting flange 110 at its second end 104, which is oriented perpendicular to the central longitudinal axis 106 and parallel to the first mounting flange 108, and includes a plurality of holes or apertures extending therethrough along respective axes parallel to the central longitudinal axis 106. In use, the winch 100 can be mounted to the other piece of machinery by mechanical fasteners such as bolts or screws that extend through the apertures in the second mounting flange 110 and through corresponding apertures in a mounting flange of the other piece of machinery. When the winch 100 is mounted to another piece of machinery in this way, the second mounting flange 110 is rigidly coupled to the other piece of machinery and remains stationary with respect to the other piece of machinery during use.

FIGS. 1 and 2 illustrate that the winch 100 includes a spool or drum 112 that is rotatable about the central longitudinal axis 106 with respect to the mounting flanges 108 and 110. In use, a cable, rope, wire, or chain having a first end and a second end opposite the first end may be fastened at the first end thereof to the drum 112. The cable may be wound up about the drum 112, and the second end of the cable may be coupled to a load to be pulled by the winch 100. The winch 100 can be operated to drive rotation of the drum 112 about the central longitudinal axis 106 with respect to the mounting flanges 108 and 110 and with respect to the piece of machinery to which the winch 100 is mounted, such as to wind up the cable onto the drum 112 to pull the load toward the winch 100.

Figure 3:
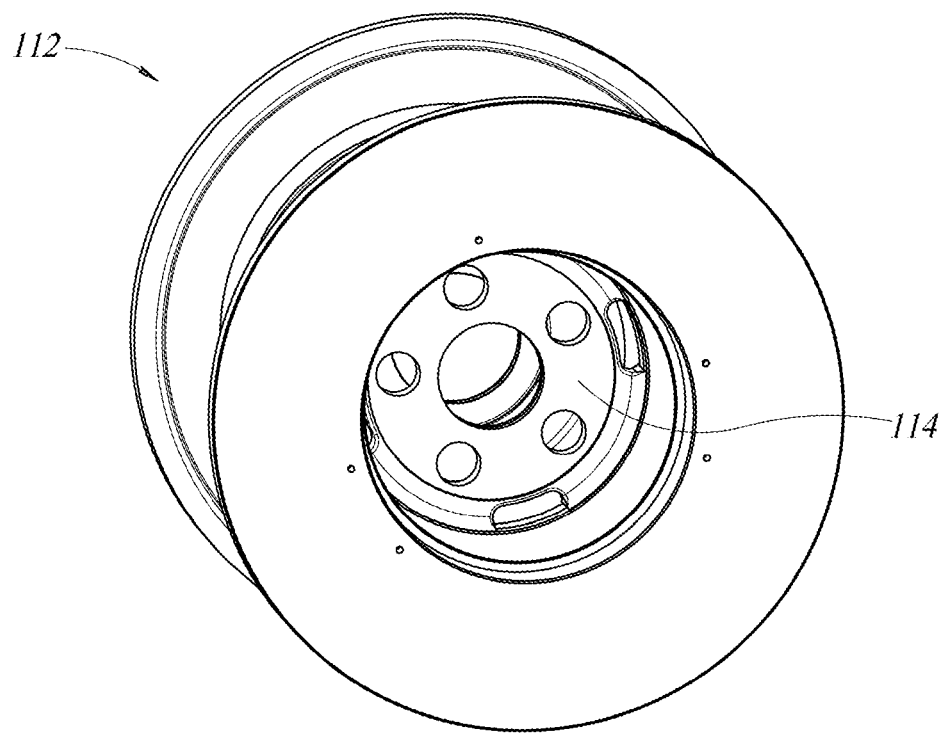
FIG. 3 illustrates a perspective view of a drum of the winch of FIGS. 1 and 2.

FIG. 3 illustrates a perspective view of the drum 112 by itself, so that additional features of the drum 112 are visible. For example, as seen in FIG. 3, the drum 112 is hollow and has a cylindrical open internal space that extends along the central longitudinal axis 106. The drum 112 also has a circular internal flange 114 that extends across its open internal space and is oriented perpendicular to the central longitudinal axis 106 at a location near the midpoint of the length of the drum 112 along the central longitudinal axis 106. The internal flange 114 includes a plurality of holes or apertures extending therethrough along respective axes parallel to the central longitudinal axis 106. In use, components of the winch 100 coupled to the first mounting flange 108, including a ball bearing for rotatably mounting the drum 112 to the mounting flange 108, can be positioned within the cylindrical open internal space within the drum 112 between the mounting flange 108 and the internal flange 114 of the drum 112. Similarly, components of the winch 100 coupled to the second mounting flange 110, including a ball bearing for rotatably mounting the drum 112 to the mounting flange 110, can be positioned within the cylindrical open internal space within the drum 112 between the mounting flange 110 and the internal flange 114 of the drum 112.

Figure 4:
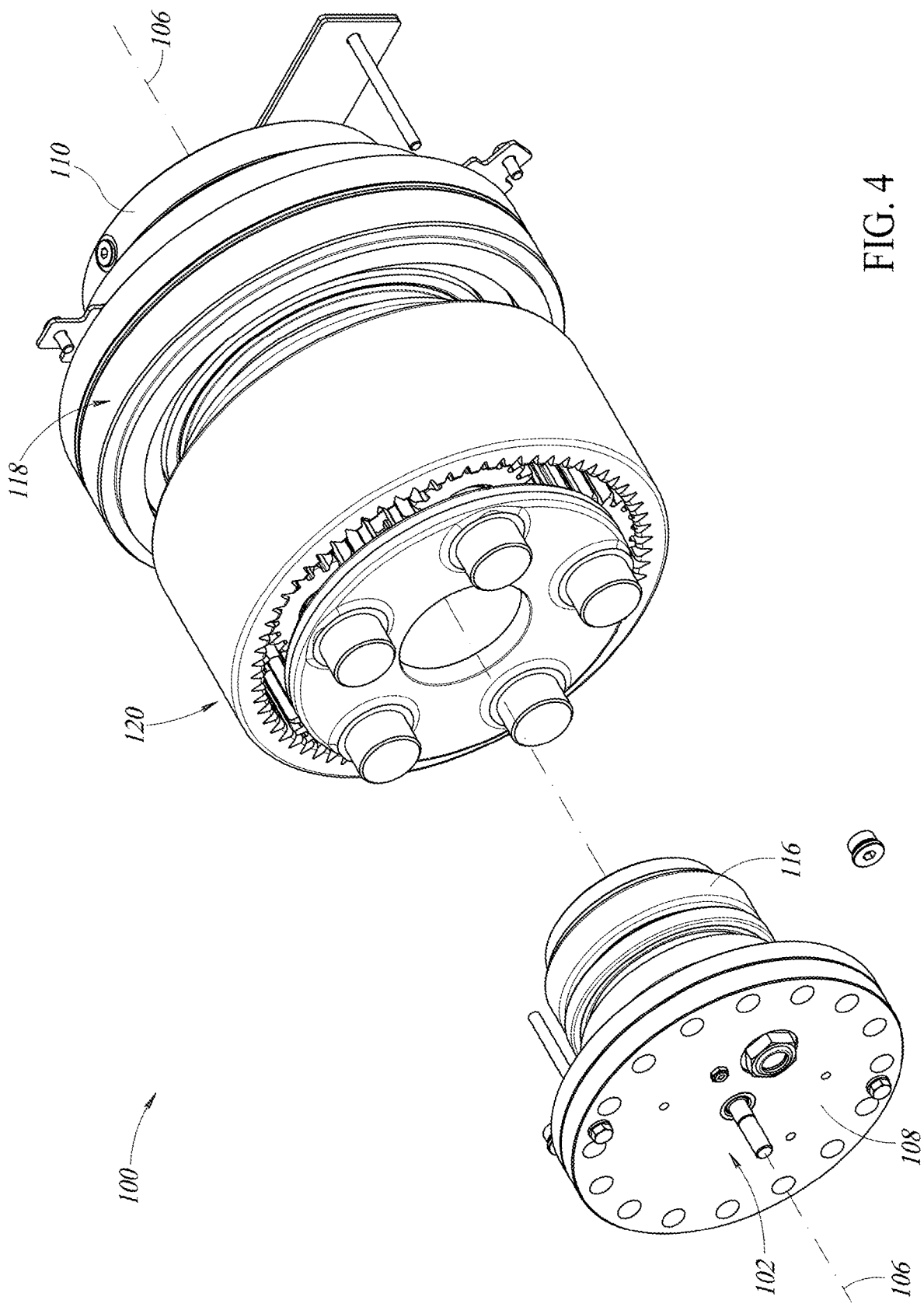
FIG. 4 illustrates a perspective view of the winch of FIGS. 1 and 2 with the drum of FIG. 3 removed to illustrate other features.
Figure 5:
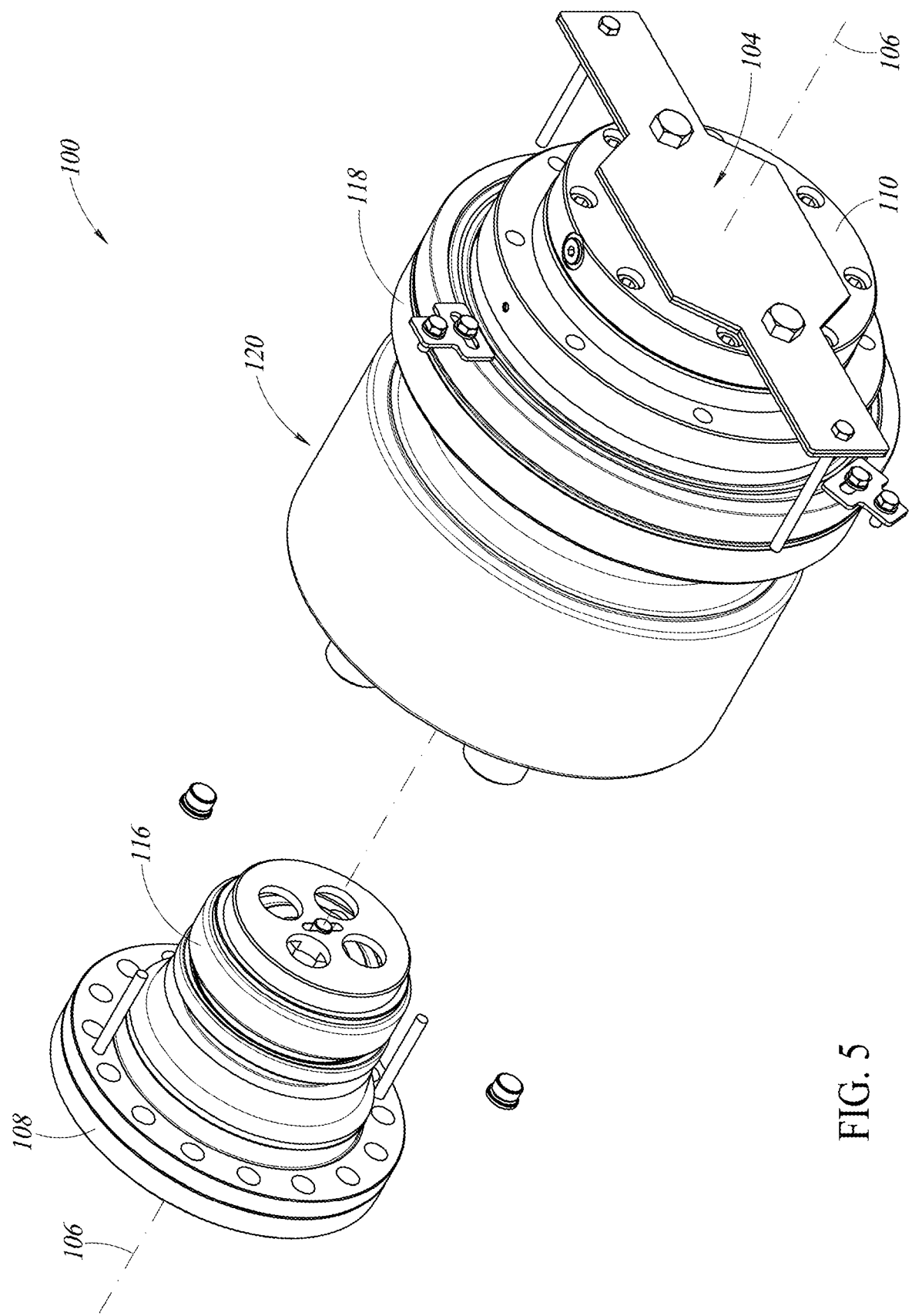
FIG. 5 illustrates another perspective view of the winch of FIGS. 1 and 2 with the drum of FIG. 3 removed to illustrate other features.

FIGS. 4 and 5 illustrate the winch 100 with the drum 112 removed so that internal components of the winch 100 are visible. As illustrated in FIGS. 4 and 5, the winch 100 includes a first ball bearing assembly 116 having an inner race rigidly coupled to the first mounting flange 108, an outer race rigidly coupled to an inner surface of the drum 112, and a plurality of balls seated within a groove formed in the inner race, within a groove formed in the outer race, and between the inner race and the outer race. The first ball bearing assembly 116 rotatably couples the drum 112 to the first mounting flange 108 such that the drum 112 can rotate about the central longitudinal axis 106 with respect to the first mounting flange 108, but cannot translate in any direction with respect to the first mounting flange 108.

As also illustrated in FIGS. 4 and 5, the winch 100 includes a second ball bearing assembly 118 having an inner race rigidly coupled to the second mounting flange 110, an outer race rigidly coupled to an inner surface of the drum 112, and a plurality of balls seated within a groove formed in the inner race, within a groove formed in the outer race, and between the inner race and the outer race. The second ball bearing assembly 118 rotatably couples the drum 112 to the second mounting flange 110 such that the drum 112 can rotate about the central longitudinal axis 106 with respect to the second mounting flange 110, but cannot translate in any direction with respect to the second mounting flange 110. FIGS. 4 and 5 also illustrate a planetary gearbox 120 of the winch 100, which is described in greater detail elsewhere herein.

Figure 6:
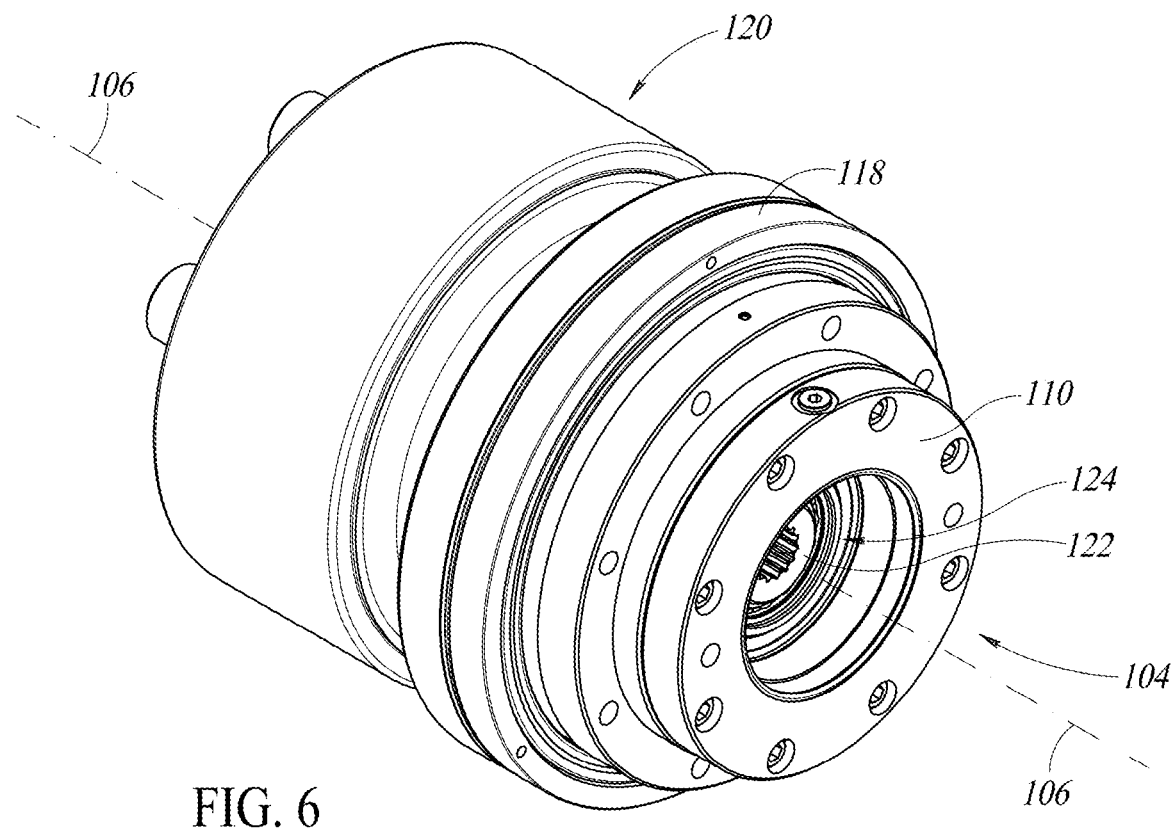
FIG. 6 illustrates a perspective view of an input end portion of the winch of FIGS. 1 and 2 with the drum of FIG. 3 and other components removed to illustrate other features.

FIG. 6 illustrates a larger perspective view of the second end 104 of the winch 100 with the drum 112 and other components removed so that other features are visible. As illustrated in FIG. 6, the winch 100 includes an input shaft coupler 122 to which an output shaft of a motor such as a hydraulic motor may be coupled to drive operation of the gearbox 120 and the drum 112. As also illustrated in FIG. 6, the winch 100 includes a third ball bearing assembly 124, which may include two ball bearings each having an inner race rigidly coupled to the input shaft coupler 122, an outer race rigidly coupled to other components of the winch 100, and a plurality of balls seated within a groove formed in the inner race, within a groove formed in the outer race, and between the inner race and the outer race. The third ball bearing assembly 124 rotatably couples the input shaft coupler 122 to the rest of the winch 100, including the second mounting flange 110, such that the input shaft coupler 122 can rotate about the central longitudinal axis 106 with respect to the second mounting flange 110, but cannot translate in any direction with respect to the second mounting flange 110.

Figure 7:
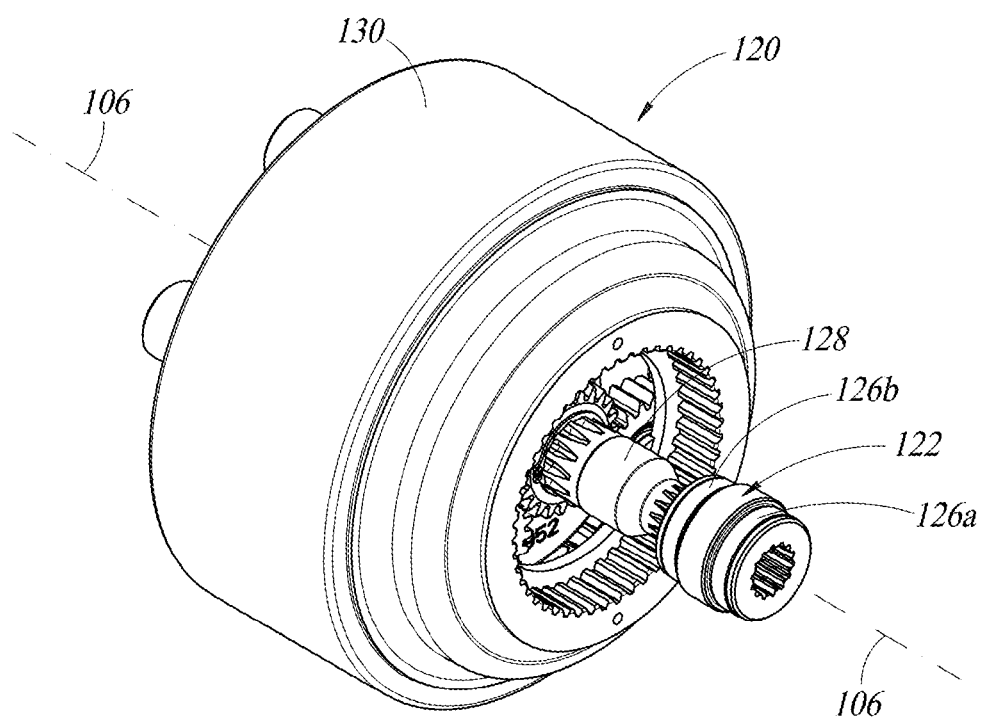
FIG. 7 illustrates a perspective view of an input end portion of the winch of FIGS. 1 and 2 with the drum of FIG. 3 and other components removed to illustrate other features, including an exterior of a planetary gearbox of the winch.

FIG. 7 illustrates the same view as FIG. 6 with additional components removed so that other features are visible. As illustrated in FIG. 7, the input shaft coupler 122 is a female-female coupler having a first, internal, input set of spline teeth at a first end thereof along the central longitudinal axis 106 that are configured to engage with complementary spline teeth of an output shaft of a motor, and a second, internal, output set of spline teeth at a second end thereof opposite to the first end thereof along the central longitudinal axis 106 that are configured to engage with complementary spline teeth of an input shaft 128 of the planetary gearbox 120. Thus, the input shaft coupler 122 can transfer rotational motion and torque from the output shaft of the motor to the input shaft 128 of the planetary gearbox 120. As also illustrated in FIG. 7, the input shaft coupler 122 has a first groove 126a and a second groove 126b formed in an outer surface thereof, within which the two ball bearings of the ball bearing assembly 124 can be seated and to which the inner races of the two ball bearings of the ball bearing assembly 124 can be rigidly coupled.

Figure 8:
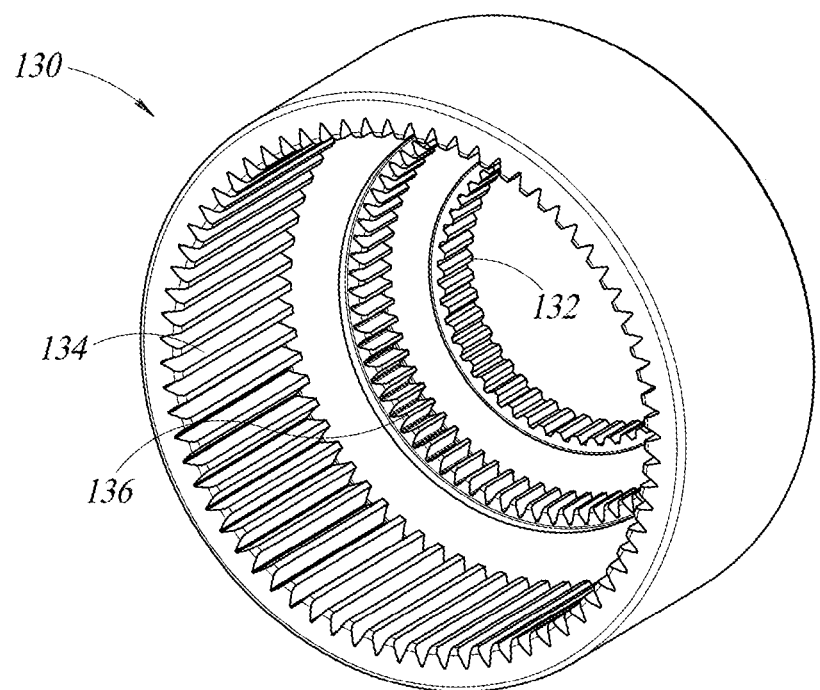
FIG. 8 illustrates a perspective view of a fixed ring gear of the planetary gearbox of FIG. 7.
Figure 9:
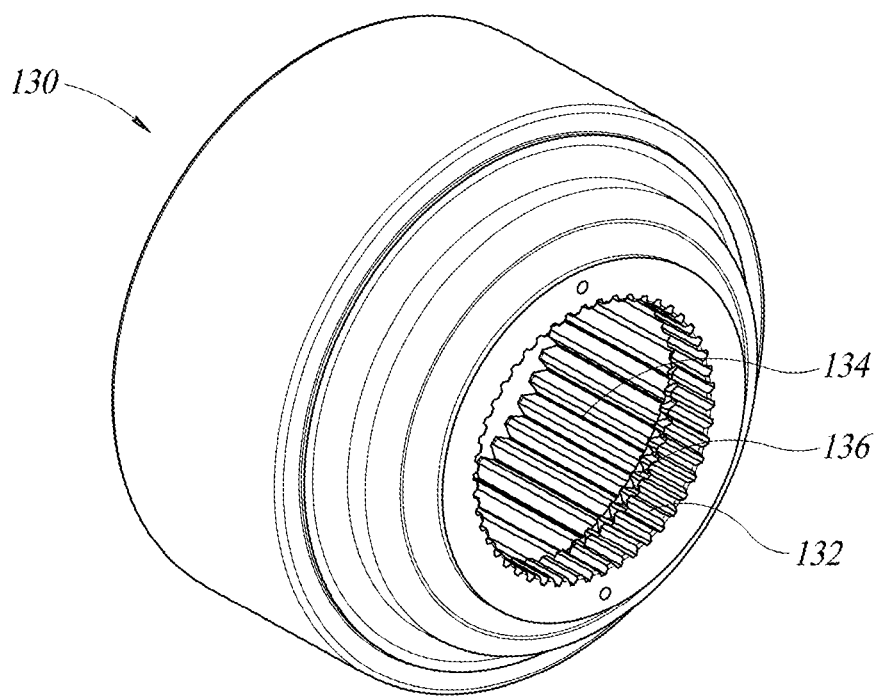
FIG. 9 illustrates another perspective view of the fixed ring gear of FIG. 8.

FIG. 7 illustrates that most of the planetary gearbox 120 is enclosed within or surrounded by a generally cylindrical outer ring gear 130 thereof. FIG. 8 illustrates a perspective view of the cylindrical outer ring gear 130 by itself, so that additional features of the ring gear 130 are visible. FIG. 9 illustrates another perspective view of the cylindrical outer ring gear 130 by itself, so that additional features of the ring gear 130 are visible. As illustrated in FIGS. 8 and 9, the ring gear 130 has an overall cylindrical shape that extends along the central longitudinal axis 106, has a cylindrical open internal space that extends along the central longitudinal axis 106, and has a relatively smooth outer surface. As also illustrated in FIGS. 8 and 9, the ring gear 130 has a first generally cylindrical internal surface 132 at a first end thereof along the central longitudinal axis 106, a second generally cylindrical internal surface 134 at a second end thereof opposite the first end thereof along the central longitudinal axis 106, and a third generally cylindrical internal surface 136 between the first generally cylindrical internal surface 132 and the second generally cylindrical internal surface 134 along the central longitudinal axis 106.

As illustrated in FIGS. 8 and 9, the first internal surface 132 is closer to the second end 104 of the winch 100 than the second internal surface 134 is, and the second internal surface 134 is closer to the first end 102 of the winch 100 than the first internal surface 132 is, when the winch 100 is assembled. As also illustrated in FIGS. 8 and 9, the first internal surface 132 has a smaller diameter than the third internal surface 136 does, and the third internal surface 136 has a smaller internal diameter than the second internal surface 134 does, such that, when the ring gear 130 is assembled into and positioned within the winch 100, the cylindrical open internal space within the ring gear 130 gets progressively wider, in a plurality of (e.g., three) steps in a direction extending from the second end 104 of the winch 100 to the first end 102 of the winch 100.

As illustrated in FIGS. 8 and 9, the first internal surface 132 of the ring gear 130 includes a set of inward-facing inner spline teeth, the second internal surface 134 of the ring gear 130 includes a first set of inward-facing inner gear teeth having a first set of dimensions, and the third internal surface 136 of the ring gear 130 includes a second set of inward-facing inner gear teeth having a second set of dimensions. As illustrated in FIG. 7, the set of inner spline teeth of the first internal surface 132 do not mate with gears or gear teeth of the planetary gearbox 120. Rather, the set of inner spline teeth of the first internal surface 132 engage complementary spline teeth that are rigidly coupled to the second mounting flange 110. Such engagement can prevent or prohibit rotation of the ring gear 130 about the central longitudinal axis 106 and keep the entirety of the ring gear 130 stationary with respect to the second mounting flange 110. Thus, in use, the ring gear 130 is stationary. The first and second sets of inner gear teeth of the ring gear 130 mate with and engage with other gears of the planetary gearbox 120 when the winch 100 is in use, as described elsewhere herein.

Figure 10:
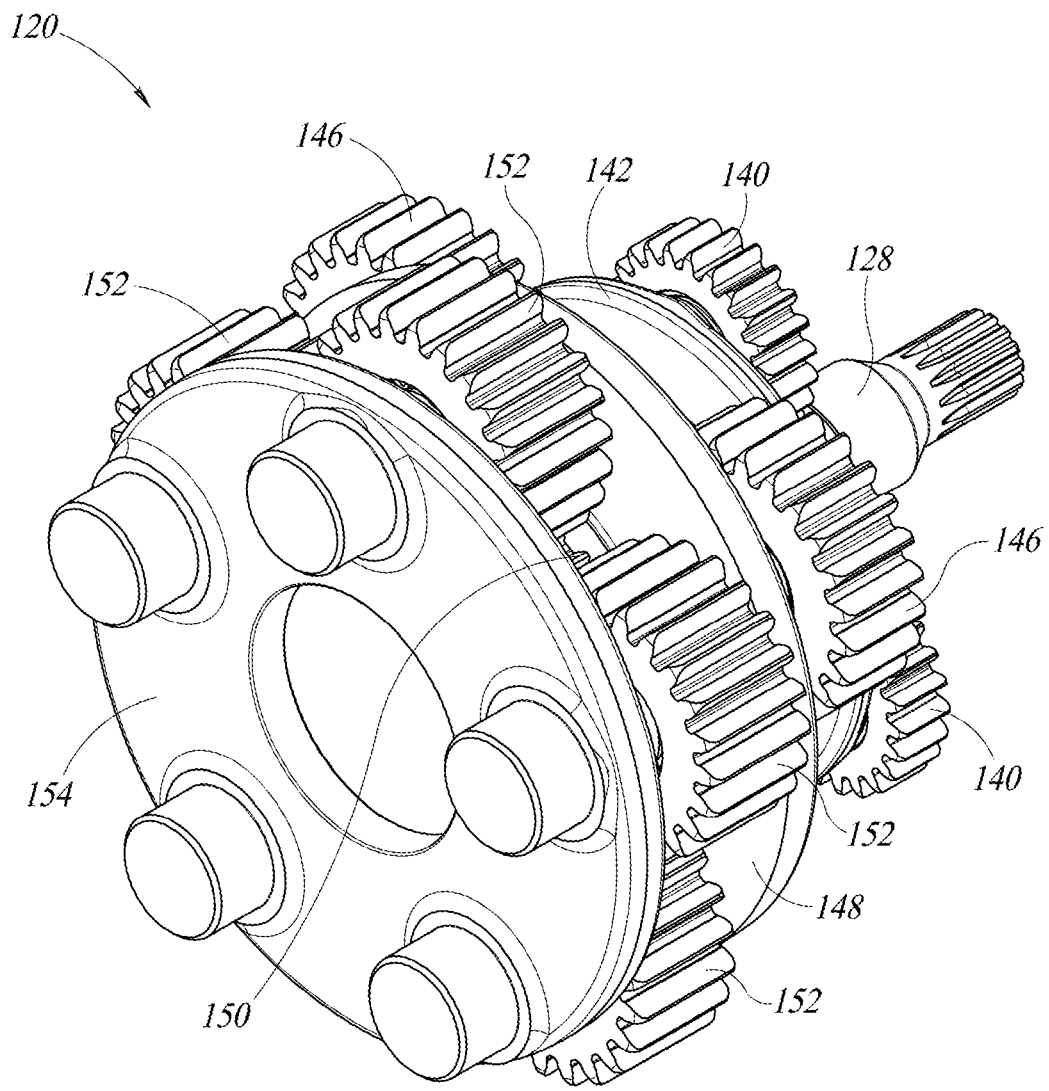
FIG. 10 illustrates a perspective view of the planetary gearbox of FIG. 7 with the fixed ring gear of FIGS. 8 and 9 removed to illustrate other features.
Figure 11:
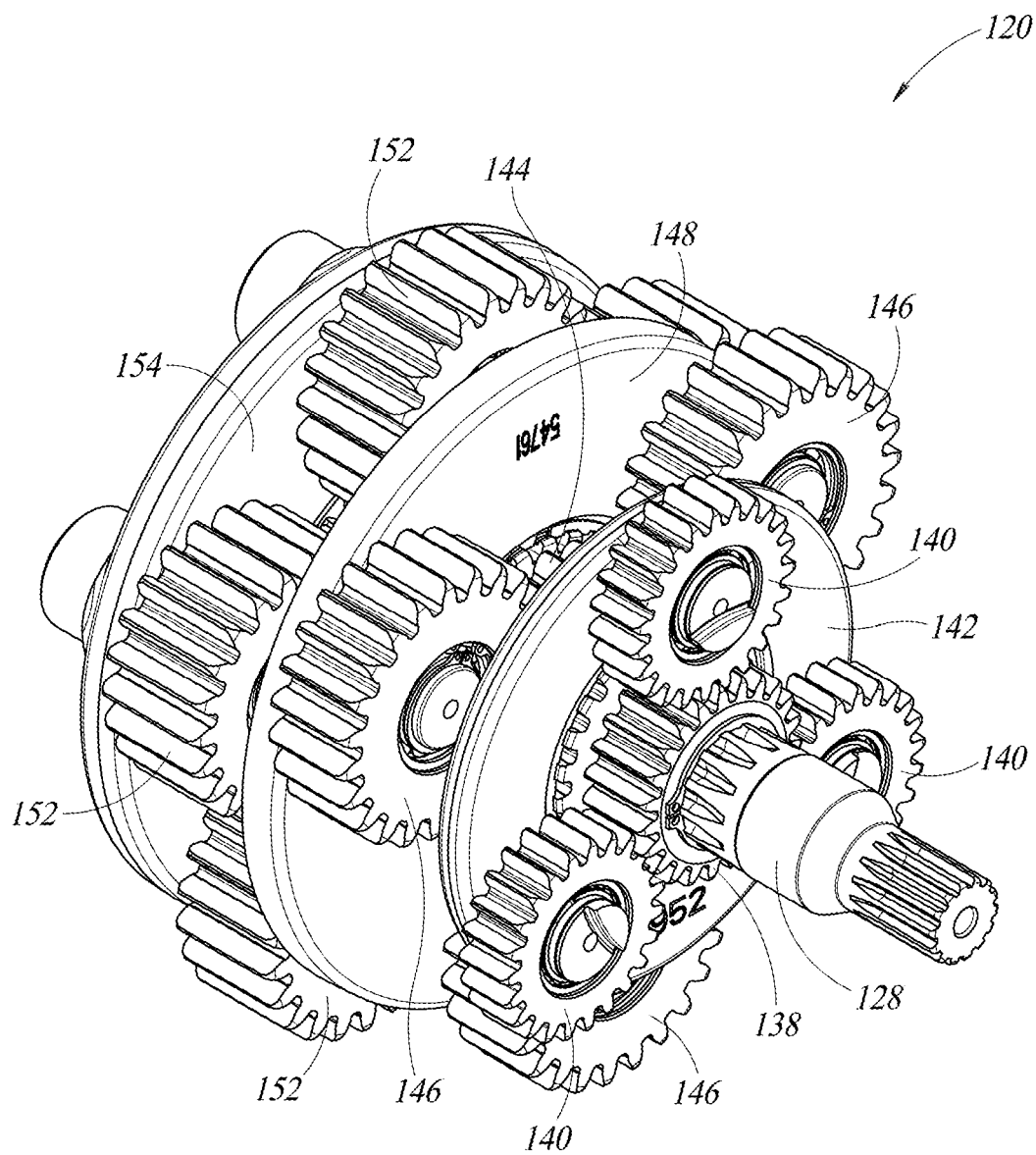
FIG. 11 illustrates another perspective view of the planetary gearbox of FIG. 7 with the fixed ring gear of FIGS. 8 and 9 removed to illustrate other features.

FIG. 10 illustrates a first perspective view, and FIG. 11 illustrates a second perspective view, of the planetary gearbox 120 with the outer ring gear 130 thereof removed so that other features are visible. As illustrated in FIGS. 10 and 11, the planetary gearbox 120 includes, in addition to the input shaft 128 and the outer ring gear 130, a first sun gear 138 having, and rotatable about, a central longitudinal axis coincident with the central longitudinal axis 106, a first set of three planet gears 140 spaced equidistantly apart from one another about the first sun gear 138 and each having, and rotatable about, a respective central longitudinal axis parallel to the central longitudinal axis 106, and a first gear carrier 142 having, and rotatable about, a central longitudinal axis coincident with the central longitudinal axis 106.

As also illustrated in FIGS. 10 and 11, the planetary gearbox 120 further includes a second sun gear 144 having, and rotatable about, a central longitudinal axis coincident with the central longitudinal axis 106, a second set of three planet gears 146 spaced equidistantly apart from one another about the second sun gear 144 and each having, and rotatable about, a respective central longitudinal axis parallel to the central longitudinal axis 106, and a second gear carrier 148 having, and rotatable about, a central longitudinal axis coincident with the central longitudinal axis 106. As also illustrated in FIGS. 10 and 11, the planetary gearbox 120 further includes a third sun gear 150 having, and rotatable about, a central longitudinal axis coincident with the central longitudinal axis 106, a third set of three planet gears 152 spaced equidistantly apart from one another about the third sun gear 150 and each having, and rotatable about, a respective central longitudinal axis parallel to the central longitudinal axis 106, and a third gear carrier 154 having, and rotatable about, a central longitudinal axis coincident with the central longitudinal axis 106.

As illustrated in FIG. 10 in particular, the third gear carrier 154 includes a generally cylindrical, disc-shaped main body having a central longitudinal axis coincident with the central longitudinal axis 106, and five pegs, pins, or shafts that extend outward from a major surface of the main body along respective axes parallel to the central longitudinal axis 106 in a direction extending away from the planet gears 152. In use, these shafts are positioned within and mated with the apertures extending through the internal flange 114 of the drum 112 illustrated in FIG. 3 such that, as the third gear carrier 154 is driven to rotate about the central longitudinal axis 106, the drum 112 is also driven to rotate about the central longitudinal axis 106.

As illustrated in FIGS. 10 and 11, and as described further elsewhere herein, the planetary gearbox 120 includes a compound planetary gear system having a plurality of (e.g., two, three in the illustrated embodiment, four, five, six, or more) planetary gear sets or stages arranged in series with one another. In particular, the input shaft 128 drives operation and rotation of a first planetary gear stage including the first sun gear 138, the first set of planet gears 140, and the first gear carrier 142, while operation and rotation of the first planetary gear stage (and an output thereof) in turn drives operation and rotation of a second planetary gear stage including the second sun gear 144, the second set of planet gears 146, and the second gear carrier 148, and operation and rotation of the second planetary gear stage (and an output thereof) in turn drives operation and rotation of a third planetary gear stage including the third sun gear 150, the third set of planet gears 152, and the third gear carrier 154. Such an arrangement can result in a larger transmission ratio and/or smaller-diameter system than alternative planetary gearing arrangements. In some alternative implementations, the planetary gearbox 120 is a single-stage planetary gearbox. In other alternative implementations, the gearbox 120 is a simple spur-type gear drive rather than a planetary gearbox.

Figure 12:
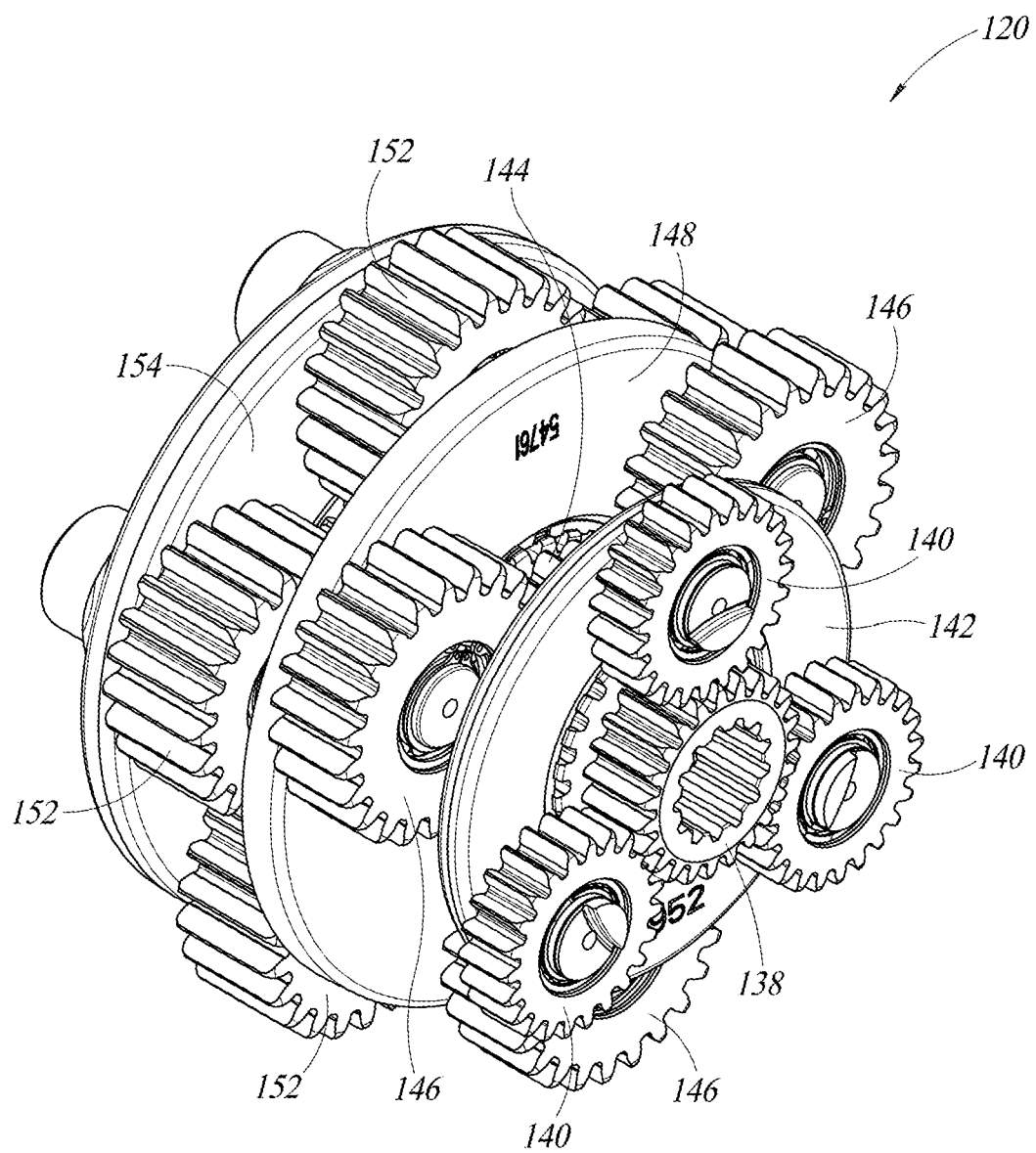
FIG. 12 illustrates a perspective view of the planetary gearbox of FIG. 7 with the fixed ring gear of FIGS. 8 and 9 and an input shaft removed to illustrate other features.

FIG. 12 illustrates the planetary gearbox 120 with the outer ring gear 130 and input shaft 128 thereof removed so that other features are visible. In particular, FIG. 12 illustrates that the first sun gear 138 is hollow and has a set of internal spline teeth meshed with external spline teeth formed in an end portion of the input shaft 128 engaged with the first sun gear 138, such that rotation of the input shaft 128 about the central longitudinal axis 106 drives rotation of the first sun gear 138 about the central longitudinal axis 106 and such that torque can be transferred from the input shaft 128 to the first sun gear 138. FIG. 12 also illustrates that the first sun gear 138 has a set of external gear teeth meshed with external gear teeth of the first set of planet gears 140, such that rotation of the sun gear 138 about the central longitudinal axis 106 drives rotation of the planet gears 140 about their own respective central longitudinal axes and such that torque can be transferred from the sun gear 138 to the planet gears 140.

When the planetary gearbox 120 is assembled, the external gear teeth of the planet gears 140 are meshed with the internal gear teeth of the third internal surface 136 of the outer ring gear 130. Thus, together, the first sun gear 138, first set of planet gears 140, the first gear carrier 142, and the third generally cylindrical internal surface 136 of outer ring gear 130 that is meshed with the first set of planet gears 140 collectively form a first planetary gear set or first planetary gear stage. When the winch 100 is in use, the input shaft 128 drives operation of the planetary gearbox 120 by driving rotation of, or transferring torque to, the first sun gear 138. The sun gear 138 in turn drives rotation of, or transfers torque to, the planet gears 140. Because the planet gears 140 are meshed with the outer ring gear 130, which is stationary, however, they are not freely rotatable about their own stationary central longitudinal axes. Thus, by driving rotation of, or transferring torque to, the planet gears 140, the planet gears 140 are driven or urged to move circumferentially as a unit about the sun gear 138 such that their own central longitudinal axes move circumferentially as a unit about the sun gear 138 and about the central longitudinal axis 106 as they rotate about their own central longitudinal axes.

Figure 13:
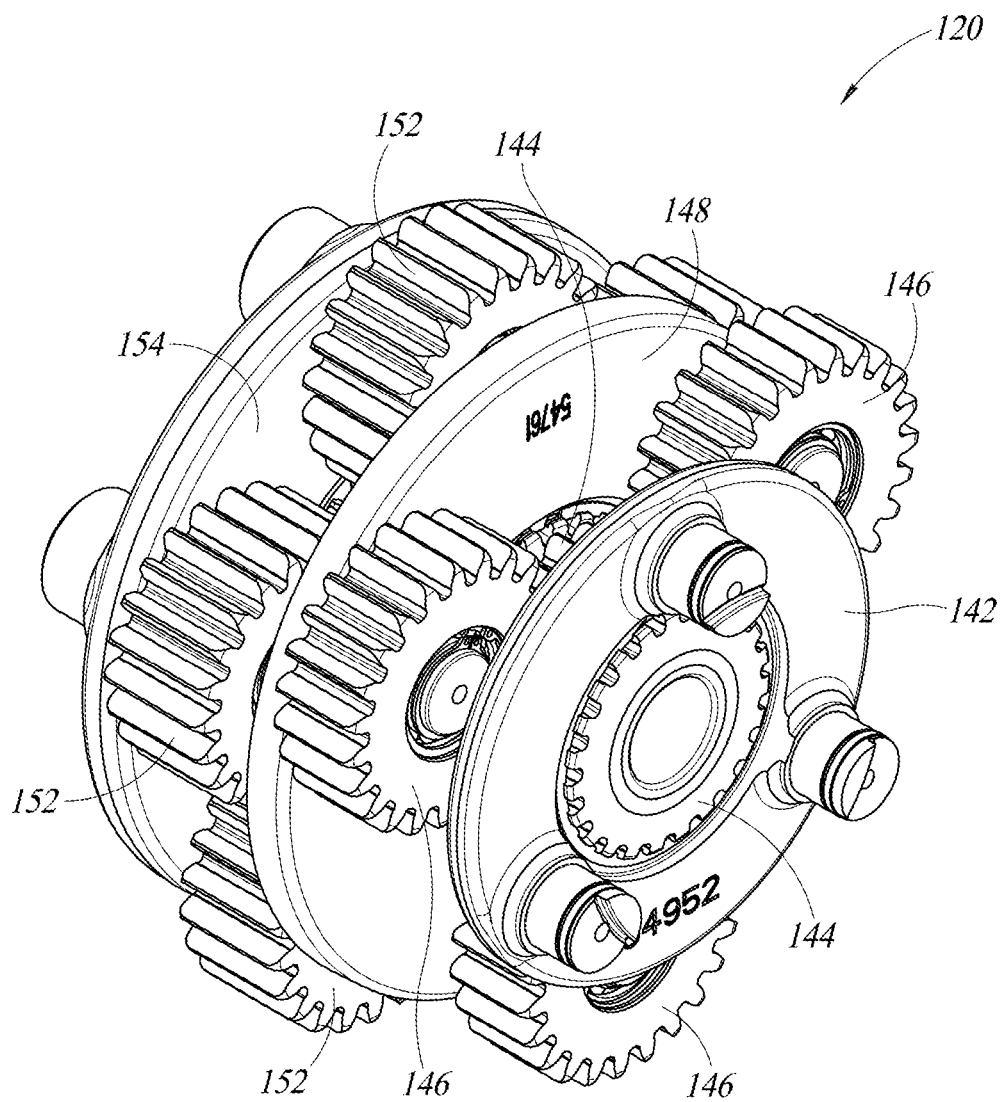
FIG. 13 illustrates a perspective view of the planetary gearbox of FIG. 7 with the fixed ring gear of FIGS. 8 and 9, an input shaft, and a first set of sun and planet gears removed to illustrate other features.

FIG. 13 illustrates the planetary gearbox 120 with the outer ring gear 130, input shaft 128, first sun gear 138, and first planet gears 140 thereof removed so that other features are visible. In particular, FIG. 13 illustrates that the first gear carrier 142 includes a generally cylindrical, disc-shaped, hollow main body having a central longitudinal axis coincident with the central longitudinal axis 106, and three pegs, pins, or shafts that extend outward from a major surface of the main body along respective axes parallel to the central longitudinal axis 106 toward the planet gears 140. In use, the first planet gears 140 are rotatably mounted onto the shafts of the gear carrier 142 such that, as the planet gears 140 are driven to rotate circumferentially as a unit about the sun gear 138 and the central longitudinal axis 106, the gear carrier 142 is also driven to rotate about the central longitudinal axis 106. As also illustrated in FIG. 13, the hollow main body of the gear carrier 142 has a set of internal spline teeth meshed with external spline teeth of the second sun gear 144 such that rotation of the gear carrier 142 about the central longitudinal axis 106 drives rotation of the second sun gear 144 about the central longitudinal axis 106.

Figure 14:
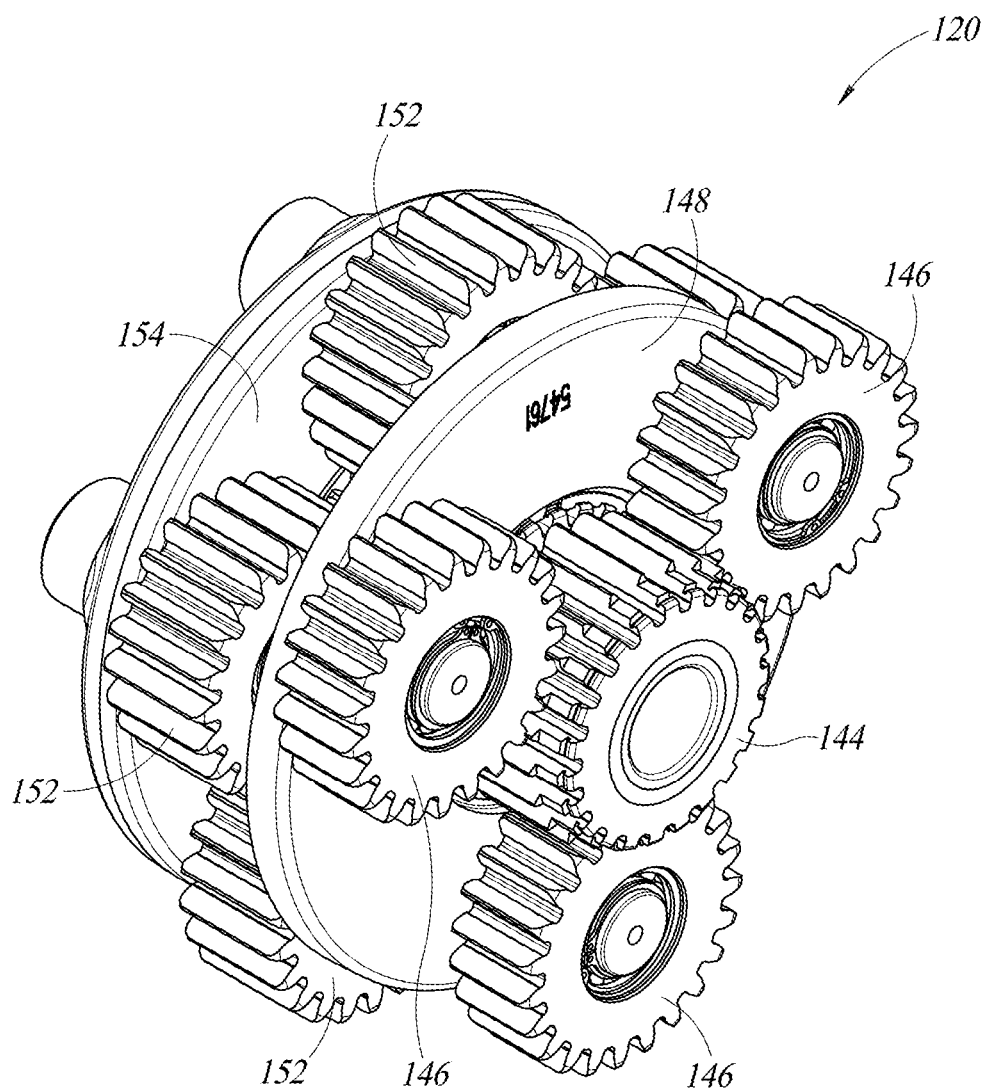
FIG. 14 illustrates a perspective view of the planetary gearbox of FIG. 7 with the fixed ring gear of FIGS. 8 and 9, an input shaft, a first set of sun and planet gears, and a first gear carrier removed to illustrate other features.

FIG. 14 illustrates the planetary gearbox 120 with the outer ring gear 130, input shaft 128, first sun gear 138, first planet gears 140, and first gear carrier 142 thereof removed so that other features are visible. In particular, FIG. 14 illustrates that the second sun gear 144 has a set of external spline teeth meshed with the internal spline teeth of the first gear carrier 142 engaged with the second sun gear 144, such that rotation of the gear carrier 142 about the central longitudinal axis 106 drives rotation of the second sun gear 144 about the central longitudinal axis 106 and such that torque can be transferred from the gear carrier 142 to the second sun gear 144. FIG. 14 also illustrates that the second sun gear 144 has a set of external gear teeth meshed with external gear teeth of the second set of planet gears 146, such that rotation of the sun gear 144 about the central longitudinal axis 106 drives rotation of the planet gears 146 about their own respective central longitudinal axes and such that torque can be transferred from the sun gear 144 to the planet gears 146.

When the planetary gearbox 120 is assembled, the external gear teeth of the planet gears 146 are meshed with the internal gear teeth of a longitudinally inner portion of the second generally cylindrical internal surface 134 of the outer ring gear 130. Thus, together, the second sun gear 144, second set of planet gears 146, the second gear carrier 148, and the longitudinally inner portion of the second generally cylindrical internal surface 134 of outer ring gear 130 that is meshed with the second set of planet gears 146 collectively form a second planetary gear set or second planetary gear stage. When the winch 100 is in use, the first planetary gear stage drives further operation of the planetary gearbox 120 by driving rotation of, or transferring torque to, the second sun gear 144. The sun gear 144 in turn drives rotation of, or transfers torque to, the planet gears 146. Because the planet gears 146 are meshed with the outer ring gear 130, which is stationary, however, they are not freely rotatable about their own stationary central longitudinal axes. Thus, by driving rotation of, or transferring torque to, the planet gears 146, the planet gears 146 are driven or urged to move circumferentially as a unit about the sun gear 144 such that their own central longitudinal axes move circumferentially as a unit about the sun gear 144 and about the central longitudinal axis 106 as they rotate about their own central longitudinal axes.

Figure 15:
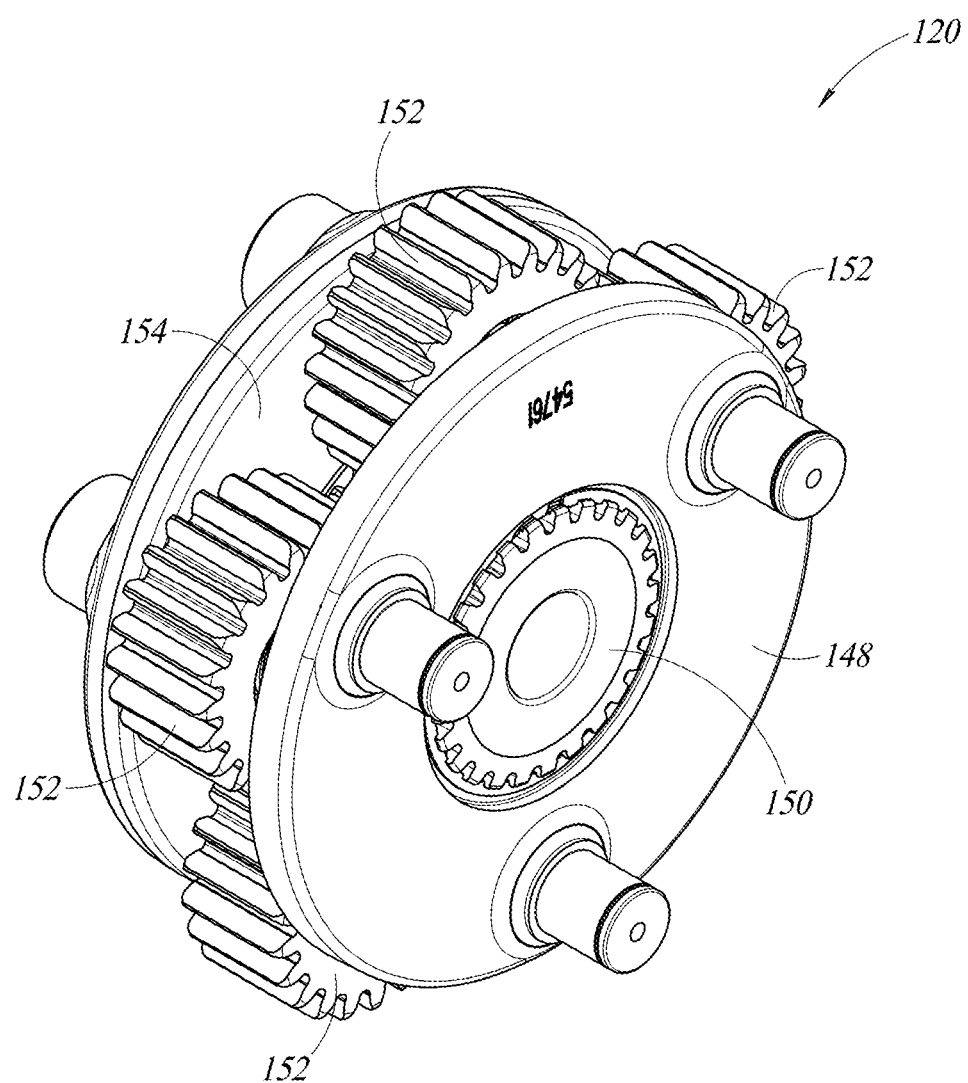
FIG. 15 illustrates a perspective view of the planetary gearbox of FIG. 7 with the fixed ring gear of FIGS. 8 and 9, an input shaft, a first set of sun and planet gears, a first gear carrier, and a second set of sun and planet gears removed to illustrate other features.

FIG. 15 illustrates the planetary gearbox 120 with the outer ring gear 130, input shaft 128, first sun gear 138, first planet gears 140, first gear carrier 142, second sun gear 144, and second planet gears 146 thereof removed so that other features are visible. In particular, FIG. 15 illustrates that the second gear carrier 148 includes a generally cylindrical, disc-shaped, hollow main body having a central longitudinal axis coincident with the central longitudinal axis 106, and three pegs, pins, or shafts that extend outward from a major surface of the main body along respective axes parallel to the central longitudinal axis 106 toward the planet gears 146. In use, the second planet gears 146 are rotatably mounted onto the shafts of the gear carrier 148 such that, as the planet gears 146 are driven to rotate circumferentially as a unit about the sun gear 144 and the central longitudinal axis 106, the gear carrier 148 is also driven to rotate about the central longitudinal axis 106. As also illustrated in FIG. 15, the hollow main body of the gear carrier 148 has a set of internal spline teeth meshed with external spline teeth of the third sun gear 150 such that rotation of the gear carrier 148 about the central longitudinal axis 106 drives rotation of the third sun gear 150 about the central longitudinal axis 106.

Figure 16:
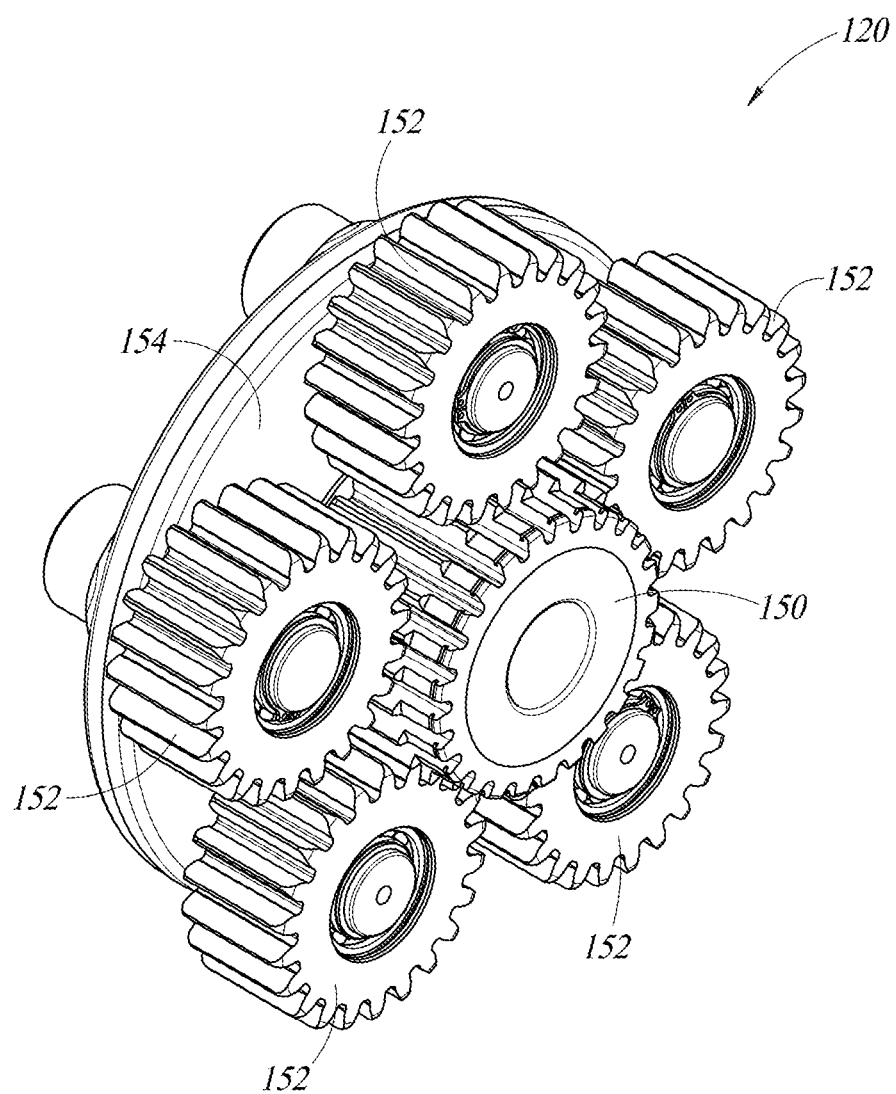
FIG. 16 illustrates a perspective view of the planetary gearbox of FIG. 7 with the fixed ring gear of FIGS. 8 and 9, an input shaft, a first set of sun and planet gears, a first gear carrier, a second set of sun and planet gears, and a second gear carrier removed to illustrate other features.

FIG. 16 illustrates the planetary gearbox 120 with the outer ring gear 130, input shaft 128, first sun gear 138, first planet gears 140, first gear carrier 142, second sun gear 144, second planet gears 146, and second gear carrier 148 thereof removed so that other features are visible. In particular, FIG. 16 illustrates that the third sun gear 150 has a set of external spline teeth meshed with the internal spline teeth of the second gear carrier 148 engaged with the third sun gear 150, such that rotation of the gear carrier 148 about the central longitudinal axis 106 drives rotation of the second sun gear 150 about the central longitudinal axis 106 and such that torque can be transferred from the gear carrier 148 to the third sun gear 150. FIG. 16 also illustrates that the third sun gear 150 has a set of external gear teeth meshed with external gear teeth of the third set of planet gears 152, such that rotation of the sun gear 150 about the central longitudinal axis 106 drives rotation of the planet gears 152 about their own respective central longitudinal axes and such that torque can be transferred from the sun gear 150 to the planet gears 152.

When the planetary gearbox 120 is assembled, the external gear teeth of the planet gears 152 are meshed with the internal gear teeth of a longitudinally outer portion of the second generally cylindrical internal surface 134 of the outer ring gear 130. Thus, together, the third sun gear 150, third set of planet gears 152, the third gear carrier 154, and the longitudinally outer portion of the second generally cylindrical internal surface 134 of outer ring gear 130 that is meshed with the third set of planet gears 152 collectively form a third planetary gear set or third planetary gear stage. When the winch 100 is in use, the second planetary gear stage drives further operation of the planetary gearbox 120 by driving rotation of, or transferring torque to, the third sun gear 150. The sun gear 150 in turn drives rotation of, or transfers torque to, the planet gears 152. Because the planet gears 152 are meshed with the outer ring gear 130, which is stationary, however, they are not freely rotatable about their own stationary central longitudinal axes. Thus, by driving rotation of, or transferring torque to, the planet gears 152, the planet gears 152 are driven or urged to move circumferentially as a unit about the sun gear 150 such that their own central longitudinal axes move circumferentially as a unit about the sun gear 150 and about the central longitudinal axis 106 as they rotate about their own central longitudinal axes.

Figure 17:
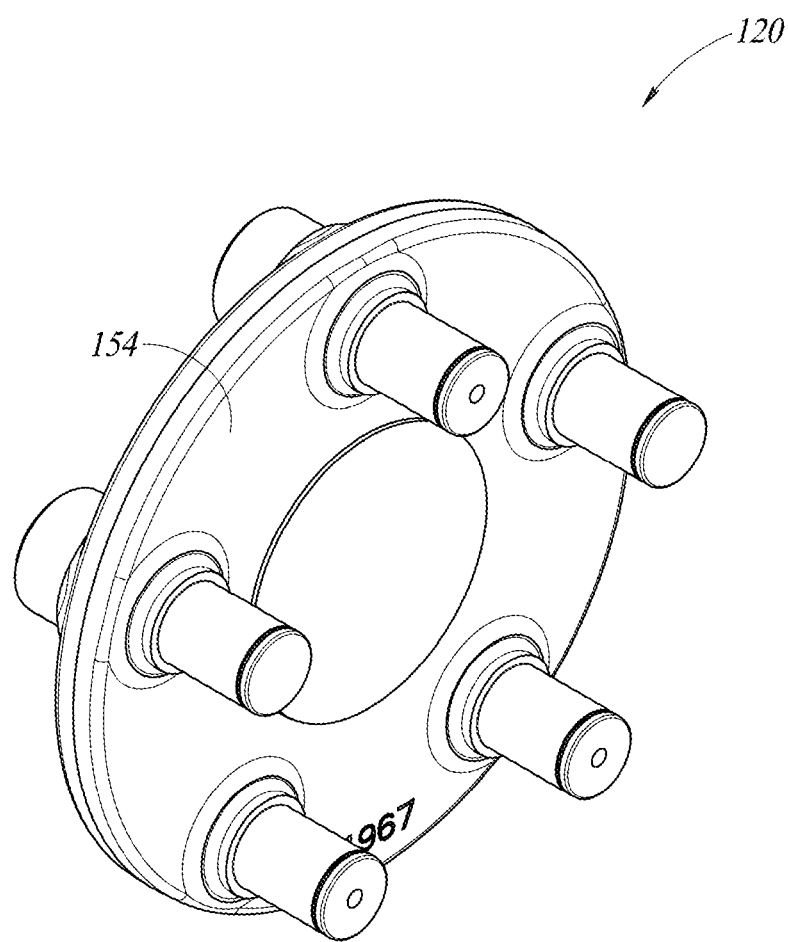
FIG. 17 illustrates a perspective view of the planetary gearbox of FIG. 7 with the fixed ring gear of FIGS. 8 and 9, an input shaft, a first set of sun and planet gears, a first gear carrier, a second set of sun and planet gears, a second gear carrier, and a third set of sun and planetary gears removed to illustrate other features.

FIG. 17 illustrates the planetary gearbox 120 with the outer ring gear 130, input shaft 128, first sun gear 138, first planet gears 140, first gear carrier 142, second sun gear 144, second planet gears 146, second gear carrier 148, third sun gear 150, and third planet gears 152 thereof removed so that other features are visible. In particular, FIG. 17 illustrates that the third gear carrier 154 includes a generally cylindrical, disc-shaped main body having a central longitudinal axis coincident with the central longitudinal axis 106, and five pegs, pins, or shafts that extend outward from a major surface of the main body along respective axes parallel to the central longitudinal axis 106 toward the planet gears 152. In use, the third planet gears 152 are rotatably mounted onto the shafts of the gear carrier 154 such that, as the planet gears 152 are driven to rotate circumferentially as a unit about the sun gear 150 and the central longitudinal axis 106, the gear carrier 154 is also driven to rotate about the central longitudinal axis 106. As described elsewhere herein, in use, the gear carrier 154 is mated with the flange 114 of the drum 112 such that, as the third gear carrier 154 is driven to rotate about the central longitudinal axis 106, the drum 112 is also driven to rotate about the central longitudinal axis 106.

As described elsewhere herein, each of the outer ring gear 130, the first sun gear 138, the first set of planet gears 140, the second sun gear 144, the second set of planet gears 146, the third sun gear 150, and the third set of planet gears 152 each have one or more sets of internal and/or external gear teeth meshed with corresponding gear teeth of other components of the planetary gearbox 120. Such components are involute spur-type gears or related involute spur-type gearing components, and their respective sets of gear teeth are involute spur-type gear teeth. Further, such components may be high-contact ratio involute spur-type gears or related high-contact ratio involute spur-type gearing components, and their respective sets of gear teeth may be high-contact ratio involute spur-type gear teeth.

A spur-type gear has a pitch, which is the distance (e.g., an angular distance with respect to a center of the gear) between similar or corresponding points (e.g., sides or centers) of two adjacent teeth. As used herein, the term "contact ratio" may be used to mean the number of pitches a tooth rotates through while in constant contact with a corresponding tooth of a meshed gear. The contact ratio is also a measure of the average number of teeth in contact between two meshed gears while the gears are in use, where a higher contact ratio indicates that, on average, more teeth are engaged while the gears are in use and a lower contact ratio indicates that, on average, fewer teeth are engaged while the gears are in use.

As used herein, the term "high-contact ratio" may be used to mean a higher contact ratio than that specified in one or more standardized specifications for gear and gear tooth dimensions, such as may be promulgated by any of various generally recognized standards-setting organizations. For example, the term "high-contact ratio" may be used to mean a higher contact ratio than that specified in ANSI/AGMA B88, titled "Tooth Thickness Specification and Measurement." Generally speaking, high-contact ratio gear teeth are longer than standard gear teeth such that high-contact ratio gearing provides a higher number of active teeth in mesh when in use than standard gearing.

A more detailed discussion of the geometry of the gears and gear teeth described herein follows. As used herein, geometrical terminology may be used in accordance with the explanations provided in AGMA 933-B03, titled "Basic Gear Geometry." A spur-type gear has a central longitudinal axis and a gear center on the central longitudinal axis about which it rotates, and a plane of rotation perpendicular to the central longitudinal axis and including the gear center within which it rotates. A first spur-type gear may be meshed with a second spur-type gear such that the first and second spur-type gears have a common plane of rotation. The first spur-type gear can have a first pitch radius and the second spur-type gear can have a second pitch radius such that the sum of the first and second pitch radiuses is equal to the distance within the common plane of rotation from the gear center of the first spur-type gear to the gear center of the second spur-type gear, and such that a ratio of the first pitch radius to the second pitch radius is equal to the ratio of the number of gear teeth in the first spur-type gear to the number of gear teeth in the second spur-type gear.

Each of the first and second spur-type gears can have a respective pitch circle centered on its respective central longitudinal axis and gear center and lying within the common plane of rotation, and having a radius equal to its respective pitch radius. Each of the first and second spur-type gears can have a respective pitch diameter that is twice its pitch radius, such that its respective pitch circle has a diameter that is twice its radius. Each of the first and second spur-type gears can also have a respective diametral pitch, which is the ratio of the spur-type gear's number of teeth to the spur-type gear's pitch diameter.

A gear tooth of a gear can have an addendum, which is the radial length of the portion of the tooth that extends outward from the gear's pitch circle away from the gear center to the top of the tooth (which may be referred to as a tooth tip), and a dedendum, which is the radial length of the portion of the tooth that extends inward from the gear's pitch circle toward the gear center to the bottom of the space or gap between the gear tooth and an adjacent gear tooth (which may be referred to as a tooth root). In standard gears and gear teeth, such as those specified in relevant AGMA standards, the addendum is typically 1.00 divided by the diametral pitch, while the dedendum is typically 1.25 divided by the diametral pitch. Related metric standards, such as ISO 6336, are geometrically equivalent in this regard, but may refer to a "module" rather than a diametral pitch, where the "module" uses different units than, and is an inverse with respect to, the diametral pitch. In some cases, a high-contact ratio gear or a high-contact ratio gear tooth can therefore have a longer addendum and/or a longer dedendum than standard gears or gear teeth. As a result of having a longer addendum, the top of the tooth may be narrower and radiuses of curvatures thereof may be smaller. As a result of having a longer dedendum, the bottom of the tooth may be wider (and bottoms of the corresponding spaces or gaps between adjacent teeth may be narrower, and radiuses of curvature thereof may be smaller).

For example, a high-contact ratio gear may have high-contact ratio gear teeth, and high-contact ratio gear teeth may have an addendum greater than 1.00 divided by the respective diametral pitch, greater than or equal to 1.05 divided by the respective diametral pitch, greater than or equal to 1.10 divided by the respective diametral pitch, greater than or equal to 1.15 divided by the respective diametral pitch, greater than or equal to 1.20 divided by the respective diametral pitch, greater than or equal to 1.25 divided by the respective diametral pitch, greater than or equal to 1.30 divided by the respective diametral pitch, greater than or equal to 1.35 divided by the respective diametral pitch, greater than or equal to 1.40 divided by the respective diametral pitch, greater than or equal to 1.45 divided by the respective diametral pitch, greater than or equal to 1.50 divided by the respective diametral pitch, greater than or equal to 1.55 divided by the respective diametral pitch, or greater than or equal to 1.60 divided by the respective diametral pitch.

As another example, a high-contact ratio gear may have high-contact ratio gear teeth, and high-contact ratio gear teeth may have a dedendum greater than 1.25 divided by the respective diametral pitch, greater than or equal to 1.30 divided by the respective diametral pitch, greater than or equal to 1.35 divided by the respective diametral pitch, greater than or equal to 1.40 divided by the respective diametral pitch, greater than or equal to 1.45 divided by the respective diametral pitch, greater than or equal to 1.50 divided by the respective diametral pitch, greater than or equal to 1.55 divided by the respective diametral pitch, greater than or equal to 1.60 divided by the respective diametral pitch, greater than or equal to 1.65 divided by the respective diametral pitch, greater than or equal to 1.70 divided by the respective diametral pitch, greater than or equal to 1.75 divided by the respective diametral pitch, or greater than or equal to 1.80 divided by the respective diametral pitch.

In some cases, such addendum and dedendum lengths can result in a gear having a contact ratio that exceeds 1.60, or that exceeds 1.65, or that exceeds 1.70, or that exceeds 1.75, or that exceeds 1.80, or that exceeds 1.85, or that exceeds 1.90, or that exceeds 1.95, or that exceeds 2.00.

Addendum and dedendum dimensions of a gear tooth generally have upper limits determined by the involute curvatures and other related dimensions of the tooth. That is, due to the involute curvatures of the tooth, as the addendum is increased, the tooth tip becomes increasingly closer to forming a point where its two sides intersect, until the tooth tip forms a point where its two sides intersect and the addendum can no longer be increased. The dedendum of the gear tooth can have an upper limit determined in a similar manner. A gear tooth having a pointed tooth tip is typically fragile and difficult to manufacture relative to a gear tooth not having a pointed tooth tip. As a result, a pointed tooth tip may be avoided by providing a gear tooth with a tooth tip thickness that extends from a radially outermost end of a first one of its sides to a radially outermost end of a second one of its sides opposite to the first.

As understood in accordance with standard gear tooth dimensions and the description herein, a minimum gear tooth tip thickness (which may also be referred to in the industry as a top land thickness) may be 0.2 divided by the diametral pitch. The gears described herein may have gear teeth having gear tooth tip thicknesses greater than zero, or greater than or equal to 0.1 divided by the diametral pitch, 0.2 divided by the diametral pitch, 0.3 divided by the diametral pitch, or 0.4 divided by the diametral pitch. Maximum addendum and dedendum dimensions may be determined by specifying a gear tooth tip thickness or a minimum gear tooth tip thickness, and may be calculated based on such a specification and other known dimensions of the gear and its gear teeth. Resulting maximum addendum dimensions may be 1.05, 1.10, 1.15, 1.20, 1.25, 1.30, 1.35, 1.40, 1.45, 1.50, 1.55, 1.60, 1.65, 1.70, 1.75, or 1.80 divided by the respective diametral pitch. Resulting maximum dedendum dimensions may be 1.30, 1.35, 1.40, 1.45, 1.50, 1.55, 1.60, 1.65, 1.70, 1.75, 1.80, 1.85, 1.90, 1.95, or 2.00 divided by the respective diametral pitch.

The geometry discussed herein is primarily directed to gears having external gear teeth and such external gear teeth, such as the sun gears and the sets of planet gears. Nevertheless, the geometry discussed herein can be easily adapted for use in gears having internal gear teeth and such internal gear teeth, such as the outer ring gear. Such adaptation generally requires that the geometry of the gear teeth be turned "inside-out." In such adaptations, the addendum becomes the radial length of the portion of the tooth that extends inward from the gear's pitch circle toward the gear center to the tooth tip, and the dedendum becomes the radial length of the portion of the tooth that extends outward from the gear's pitch circle away from the gear center to the tooth root.

In some implementations, all of the gears in the planetary gearbox 120 are high-contact ratio spur-type gears and all of the gear teeth in the planetary gearbox 120 are high-contact ratio spur-type gear teeth. All of, or any subset of, such gears and such gear teeth may have an addendum greater than 1.00 divided by the respective diametral pitch, or greater than or equal to 1.05, 1.10, 1.15, 1.20, 1.25, 1.30, 1.35, 1.40, 1.45, or 1.50 divided by the respective diametral pitch, as well as a dedendum greater than 1.25 divided by the respective diametral pitch, or greater than or equal to 1.30, 1.35, 1.40, 1.45, 1.50, 1.55, 1.60, 1.65, 1.70, or 1.75 divided by the respective diametral pitch, and a correspondingly high contact ratio resulting from such dimensions.

In some implementations, such a subset can be all of the gears and all of the gear teeth in the first planetary gear stage of the planetary gearbox 120 (e.g., the first sun gear 138 and its gear teeth, the first set of planet gears 140 and their gear teeth, and the third generally cylindrical internal surface 136 of outer ring gear 130 that is meshed with the first set of planet gears 140, and its gear teeth). In some implementations, such a subset can be all of the gears and all of the gear teeth in the second planetary gear stage of the planetary gearbox 120 (e.g., the second sun gear 144 and its gear teeth, the second set of planet gears 146 and their gear teeth, and the longitudinally inner portion of the second generally cylindrical internal surface 134 of outer ring gear 130 that is meshed with the second set of planet gears 146, and its gear teeth). In some implementations, such a subset can be all of the gears and all of the gear teeth in the third planetary gear stage of the planetary gearbox 120 (e.g., the third sun gear 150 and its gear teeth, the third set of planet gears 152 and their gear teeth, and the longitudinally outer portion of the second generally cylindrical internal surface 134 of outer ring gear 130 that is meshed with the third set of planet gears 152, and its gear teeth).

In some implementations, such a subset can be all of the sun gears and their respective gear teeth (e.g., each of the first sun gear 138, second sun gear 144, and third sun gear 150, and their respective gear teeth). In some implementations, such a subset can be all of the planet gears and their respective gear teeth (e.g., each of the first set of planet gears 140, each of the second set of planet gears 146, each of the third set of planet gears 152, and their respective gear teeth). In some implementations, such a subset can be the outer ring gear 130, its second generally cylindrical internal surface 134 and third generally cylindrical internal surface 136, and the respective gear teeth thereof.

While the present disclosure has focused on high-contact ratio gearing in the winch 100, the features described herein may be applied to other devices, such as hoists, track drives, wheel drives, or other drive systems including gearboxes. Such devices, including the winch 100, can be mounted, such as in the manner described herein, to heavy equipment or machinery, such as cranes, mobile cranes, offshore (e.g., oil platform) cranes, utility vehicles such as bucket trucks, trucks, trailers, naval vessels, and tractor-type equipment such as bulldozers.

The gears described herein are high-contact ratio gears and include high-contact ratio gear teeth. As a result, in each meshed pair of gears described herein, a greater number of gear teeth are, on average, in contact with one another than would be in comparable standard, non-high-contact ratio gear systems. As a result, loads are distributed over a greater number of teeth, thereby increasing load carrying capacity and decreasing bending or flexure of the teeth, thereby reducing noise and other NVH-related issues.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A winch or hoist, comprising:
an input shaft;
a rotatable drum; and
a gearbox including a plurality of high-contact ratio spur-type gears, the gearbox coupled to the input shaft and to the rotatable drum such that rotation of the input shaft at a first speed drives rotation of the rotatable drum at a second speed that is different than the first speed, wherein the gearbox is a compound planetary gearbox system having a plurality of planetary gear stages arranged in series, wherein the input shaft drives operation and rotation of a first stage of the planetary gear stages including a first sun gear, a first set of planet gears, and a first gear carrier, while operation and rotation of the first stage in turn drives operation and rotation of a second stage of the planetary gear stages including a second sun gear, a second set of planet gears, and a second gear carrier, and operation and rotation of the second stage in turn drives operation and rotation of a third stage of the planetary gear stages including a third sun gear, a third set of planet gears, and a third gear carrier, and wherein rotation of the third gear carrier drives rotation of the rotatable drum via an internal flange of the rotatable drum to which the third gear carrier is insertably received, and wherein each of the first, second and third sun gears and each of the first, second and third sets of planet gears are the high-contact ratio spur-type gears of the gearbox.

2. The winch or hoist of claim 1 wherein the high-contact ratio spur-type gears include internal gear teeth and external gear teeth.

3. The winch or hoist of claim 1 wherein the high-contact ratio spur-type gears have a higher contact ratio than specified in ANSI/AGMA B88.

4. The winch or hoist of claim 1 wherein the high-contact ratio spur-type gears include gear teeth having longer addendums than specified in ANSI/AGMA B88.

5. The winch or hoist of claim 1 wherein the high-contact ratio spur-type gears include gear teeth having longer dedendums than specified in ANSI/AGMA B88.

6. The winch or hoist of claim 1 wherein each of the high-contact ratio spur-type gears has a respective diametral pitch and includes gear teeth having addendums greater than 1.00 divided by the respective diametral pitch.

7. The winch or hoist of claim 1 wherein each of the high-contact ratio spur-type gears has a respective diametral pitch and includes gear teeth having addendums greater than or equal to 1.05 divided by the respective diametral pitch.

8. The winch or hoist of claim 1 wherein each of the high-contact ratio spur-type gears has a respective diametral pitch and includes gear teeth having addendums greater than or equal to 1.10 divided by the respective diametral pitch.

9. The winch or hoist of claim 1 wherein each of the high-contact ratio spur-type gears has a respective diametral pitch and includes gear teeth having addendums greater than or equal to 1.15 divided by the respective diametral pitch.

10. The winch or hoist of claim 1 wherein each of the high-contact ratio spur-type gears has a respective diametral pitch and includes gear teeth having addendums greater than or equal to 1.20 divided by the respective diametral pitch.

11. The winch or hoist of claim 1 wherein each of the high-contact ratio spur-type gears has a respective diametral pitch and includes gear teeth having dedendums greater than 1.25 divided by the respective diametral pitch.

12. The winch or hoist of claim 1 wherein each of the high-contact ratio spur-type gears has a respective diametral pitch and includes gear teeth having dedendums greater than or equal to 1.30 divided by the respective diametral pitch.

13. The winch or hoist of claim 1 wherein each of the high-contact ratio spur-type gears has a respective diametral pitch and includes gear teeth having dedendums greater than or equal to 1.35 divided by the respective diametral pitch.

14. The winch or hoist of claim 1 wherein each of the high-contact ratio spur-type gears has a respective diametral pitch and includes gear teeth having dedendums greater than or equal to 1.40 divided by the respective diametral pitch.

15. The winch or hoist of claim 1 wherein each of the high-contact ratio spur-type gears has a contact ratio greater than 1.60.

16. The winch or hoist of claim 1 wherein each of the high-contact ratio spur-type gears has a contact ratio greater than 1.80.

17. The winch or hoist of claim 1 wherein each of the high-contact ratio spur-type gears has a contact ratio greater than 2.00.

* * * * *